(12) United States Patent
Virtej et al.

(10) Patent No.: US 12,143,848 B2
(45) Date of Patent: Nov. 12, 2024

(54) MEASUREMENT REPORTING

(71) Applicant: NOKIA TECHNOLOGIES OY, Espoo (FI)

(72) Inventors: Elena Virtej, Espoo (FI); Tero Henttonen, Espoo (FI); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 392 days.

(21) Appl. No.: 17/607,478

(22) PCT Filed: Apr. 30, 2020

(86) PCT No.: PCT/EP2020/062025
§ 371 (c)(1),
(2) Date: Oct. 29, 2021

(87) PCT Pub. No.: WO2020/221858
PCT Pub. Date: Nov. 5, 2020

(65) Prior Publication Data
US 2022/0225144 A1    Jul. 14, 2022

Related U.S. Application Data

(60) Provisional application No. 62/842,328, filed on May 2, 2019.

(51) Int. Cl.
*H04W 24/10* (2009.01)
*H04W 76/27* (2018.01)

(52) U.S. Cl.
CPC .......... *H04W 24/10* (2013.01); *H04W 76/27* (2018.02)

(58) Field of Classification Search
CPC ..... H04W 24/10; H04W 76/27; H04W 24/02; H04L 5/0098; H04L 5/001; H04L 5/0035
See application file for complete search history.

(56) References Cited

U.S. PATENT DOCUMENTS

| | | | | |
|---|---|---|---|---|
| 2013/0208617 A1* | 8/2013 | Fukuta | ................. | H04W 24/08 370/252 |
| 2017/0188256 A1* | 6/2017 | Wang | ................. | H04B 17/318 |
| 2017/0359747 A1* | 12/2017 | Lunden | ................. | H04L 5/0098 |
| 2018/0098376 A1* | 4/2018 | Jang | ..................... | H04W 28/082 |
| 2020/0260311 A1* | 8/2020 | Jung | ..................... | H04W 24/10 |

OTHER PUBLICATIONS

Communication pursuant to Article 94(3) EPC dated Sep. 15, 2022, corresponding to European Patent Application No. 20723364.4.
(Continued)

*Primary Examiner* — Steven Hieu D Nguyen
(74) *Attorney, Agent, or Firm* — SQUIRE PATTON BOGGS (US) LLP (57) ABSTRACT

According to a first embodiment, a method may comprise transmitting, by a user equipment, at least one RRCConnectionSetupComplete message comprising at least one reporting indication to a network entity. The method may further comprise receiving, by the user equipment, RRCConnectionReconfiguration message from the network entity. The method may further comprise transmitting, by the user equipment, at least one RRCConnectionReconfigurationComplete message to the network entity.

6 Claims, 5 Drawing Sheets

(56) References Cited

OTHER PUBLICATIONS

International Search Report and Written Opinion dated Aug. 6, 2020 corresponding to International Patent Application No. PCT/EP2020/062025.

Qualcomm Incorporated, "Supporting early measurement reporting in NR," 3GPP Draft; R2-1900104, 3GPP TSG RAN WG2 Meeting #105, Athens, Greece, Feb. 15, 2019, XP051601504.

Qualcomm Incorporated, "Summary of email discussion [105#54] [NR/eCA-DC]: measurement configuration," 3GPP Draft; R2-1903237, Xi'an, China, Apr. 6, 2019, XP051700587.

Nokia et al., "Details of Direct activation of SCell," 3GPP Draft; R2-1806773, 3GPP TSG-RAN WG2 Meeting #102, Busan, South Korea, May 20, 2018, XP051443233.

Nokia et al., "Release 15 legacy text change due to release 16 early measurements," 3GPP Draft; R2-2000675, 3GPP TSG-RAN WG2 Meeting #109e, Elbonia, Feb. 14, 2020, XP051849250.

Nokia et al., "Configuration details of early measurements," 3GPP Draft; R2-1906178, 3GPP TSG-RAN WG2 Meeting #106, Reno, USA, May 2, 2019, XP051710504.

3GPP TS 36.133 V16.1.0 (Mar. 2019), Technical Specification, 3rd Generation Partnership Project; Technical Specification Group Radio Access Network; Evolved Universal Terrestrial Radio Access (E-UTRA); Requirements for support of radio resource management (Release 16), Mar. 2019.

3GPP TS 36.331 V15.5.1 (Apr. 2019), Technical Specification, 3rd Generation Partnership Project; Technical Specification Group Radio Access Network; Evolved Universal Terrestrial Radio Access (E-UTRA); Radio Resource Control (RRC); Protocol specification (Release 15), Apr. 2019.

Communication pursuant to Article 94(3) EPC dated Nov. 16, 2023, corresponding to European Patent Application No. 20723364.4.

* cited by examiner

MEASUREMENT REPORTING

BACKGROUND

Field

Various communication systems may benefit from improved measurement configurations in dual connectivity carrier aggregation.

Description of the Related Art

Under 3rd Generation Partnership Project (3GPP) new radio (NR), dual connectivity carrier aggregation (DCCA) is a continuation of enhanced utilization of carrier aggregation (euCA). This may allow faster setup of DC/CA for LTE and/or NR by enabling earlier measurements for network devices in an IDLE/INACTIVE mode, as well as providing the network with information to immediately set up DC/CA upon transition from an IDLE/INACTIVE mode to a CONNECTED mode.

BRIEF DESCRIPTION OF THE DRAWINGS

For proper understanding of this disclosure, reference should be made to the accompanying drawings, wherein.

DETAILED DESCRIPTION

Previous techniques allow duplication of early LTE measurements for NR and multi-radio access technology dual connectivity (MR-DC). Specifically, 3GPP Release (Rel)-16 describes early measurement configurations containing configurations for both NR and LTE, only NR configuration, or only LTE configuration, in order to support various MR-DC and CA scenarios. NR early measurement configurations may also include NR-specific measurement parameter configurations. Available beam and cell level measurement results may also be included in early measurement reporting (if configured).

In LTE, Rel-15 euCA idle mode measurements refer to the case when a network may request user equipment (UE) to measure inter-frequency carriers in an RRC_IDLE mode via system information or via dedicated measurement configuration in RRC Connection Release. The UE performs the requested measurements, and provides an indication of the availability of a measurement report to the base station during a RRC Connection Setup or Resume procedure. The network may request the UE to report those measurements after security activation, as described in TS 36.331. This may also apply where UE performs IDLE/INACTIVE mode measurements as configured by the network in idle or broadcast signaling, which may be reported upon connection establishment/resume, or after connection establishment/resume.

Figure 1:
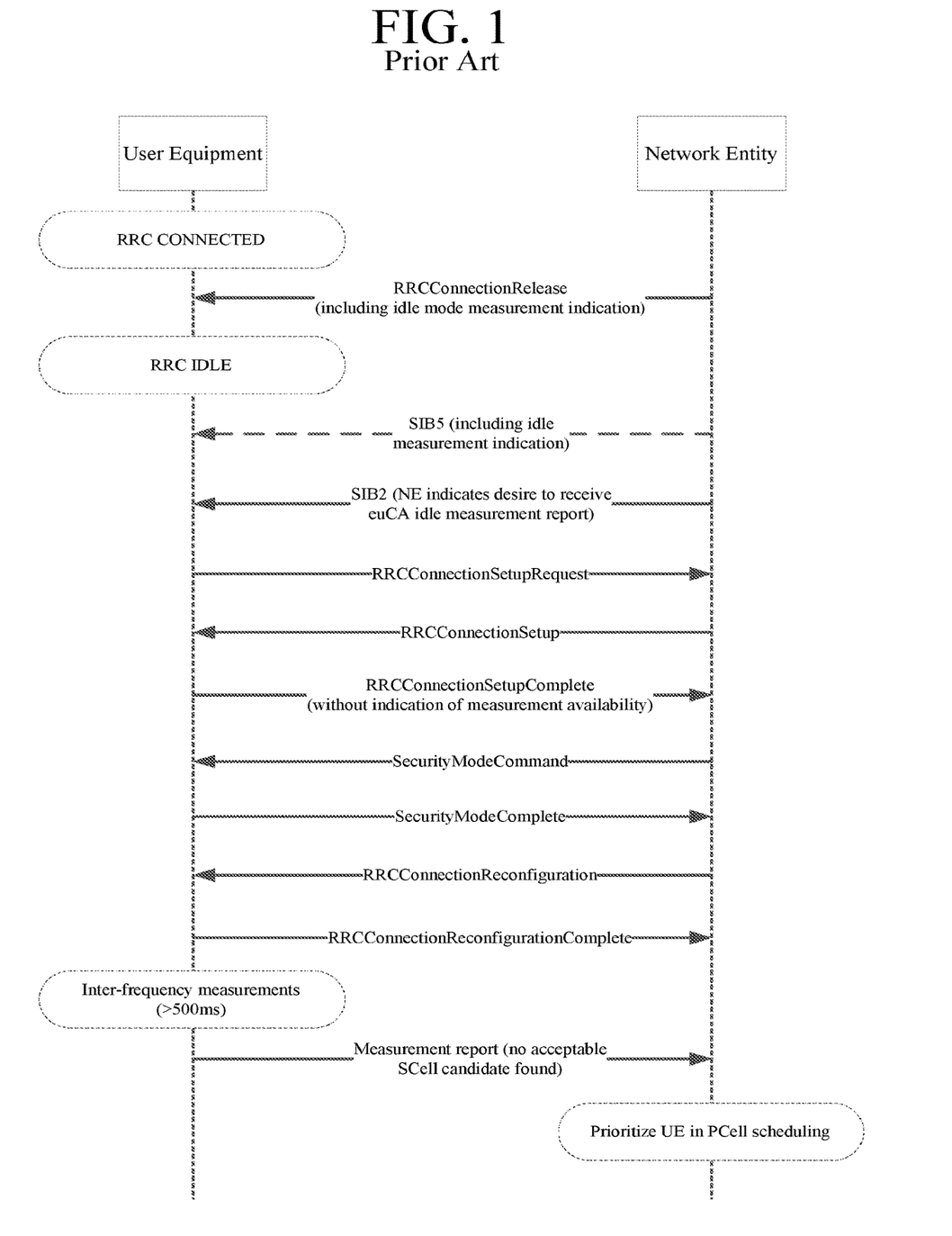
FIG. 1 illustrates an example of IDLE mode measurements.

In LTE euCA, there is only one cell quality threshold, qualityThreshold. Thus, a UE would be required to report its measurement results for the frequencies and cells which meet particular configured thresholds. For example, FIG. 1 illustrates an example of euCA IDLE mode measurement functionality under LTE Rel-15, where RRCConnectionSetupComplete does not include any information on measurement availability since UE does not have any measurements to report. Thus, the UE will proceed through an inefficient procedure of inter-frequency measurements in CONNECTED mode, possibly leading to more than a 500 ms delay with no acceptable small cell being detected.

Alternatively, if the UE is configured to report euCA measurements, but does not have a mechanism for reporting that measurements are not available, the network may still perform configurations without the reported measurements, or wait an extended time period to receive measurements. Furthermore, the network may not know why the indication is missing. There may be two main reasons. First, the measurements performed by the UE did not find any acceptable, for example small cell, candidates, where, for example, no cells were above a configured threshold or there were no receivable cells. Second, the UE did not perform the required measurements, for example, because the UE either does not support the IDLE mode measurements, or the UE was not requested to perform IDLE mode measurements. Under current techniques, the network will be unaware why the UE has not reported measurements, leaving the network unable to know whether to configure the UE with inter-frequency measurements for early reporting.

In an example embodiment, the availability indication by the UE may be extended to provide the network a reason on why measurements were not provided. Besides availability, the UE may provide an indication that it has performed at least one IDLE/INACTIVE measurement, but did not find any cells fulfilling the quality threshold. Another possible reason that the measurements are not reported could be that the UE did not perform measurements, or that performed measurements became obsolete.

In an example embodiment, an early measurement availability indication may be extended to include why the early measurement results are not available, even though they were configured for the UE.

The extended early measurement (or idle/inactive state measurement) availability indication could be per carrier frequency/measurement object or alternatively one single indication for all carriers configured with early measurements and reporting (if at least one measurement available to be reported exits or does not exist because measurements were below the threshold, or does not exist because the measurements were not performed).

Certain embodiments described herein may have various benefits and/or advantages to overcome the disadvantages described above. For example, certain embodiments may enable a UE to include a cell quality threshold in NR early measurement configurations for both IDLE/INACTIVE modes, where a UE is required to report the measurement results for the frequencies and cells which meet the particular configured thresholds. Thus, certain embodiments may enable a network to configure a UE with inter-frequency measurements for early reporting, reducing reporting overhead of low-quality cells.

For example, early measurement configurations may indicate that measurement configurations have been received by the UE from the network, for example, before the UE transitions to an idle or inactive mode, or being received by the UE during an idle/inactive mode from system information broadcast signaling.

For example, UE may perform the measurements accordingly while in idle or inactive. Upon transitioning back to connected, UE may inform network about the measurements it performed. In some cases these measurements could be done also during connection establishment/resume. For example, they may be done just before or during connection setup or resume. This allows the NE to receive the measurements results earlier than if the measurements and reporting would have been configured and done after the connection setup or connection resume.

Certain embodiments described herein enable a network to be aware of why the network did not receive the requested measurement reports from the user equipment. This technique is preferable to not configuring the threshold for reporting cells because the network is informed of the information earlier, for example, in IDLE mode case. As a result, the network may be informed earlier on the measurement quality, and/or why no measurements are available. Where all the cells are below the quality threshold, the UE will not report anything to network, requiring hundreds of milliseconds until new measurements are done in connected. When no threshold is configured, the network only receives information on the availability of measurements, without an indication as to their quality, allowing potential reporting of low-quality cells that may not be configured to the UE. In an example, similar techniques can be applied also for INACTIVE state or any other power saving state.

Figure 2:
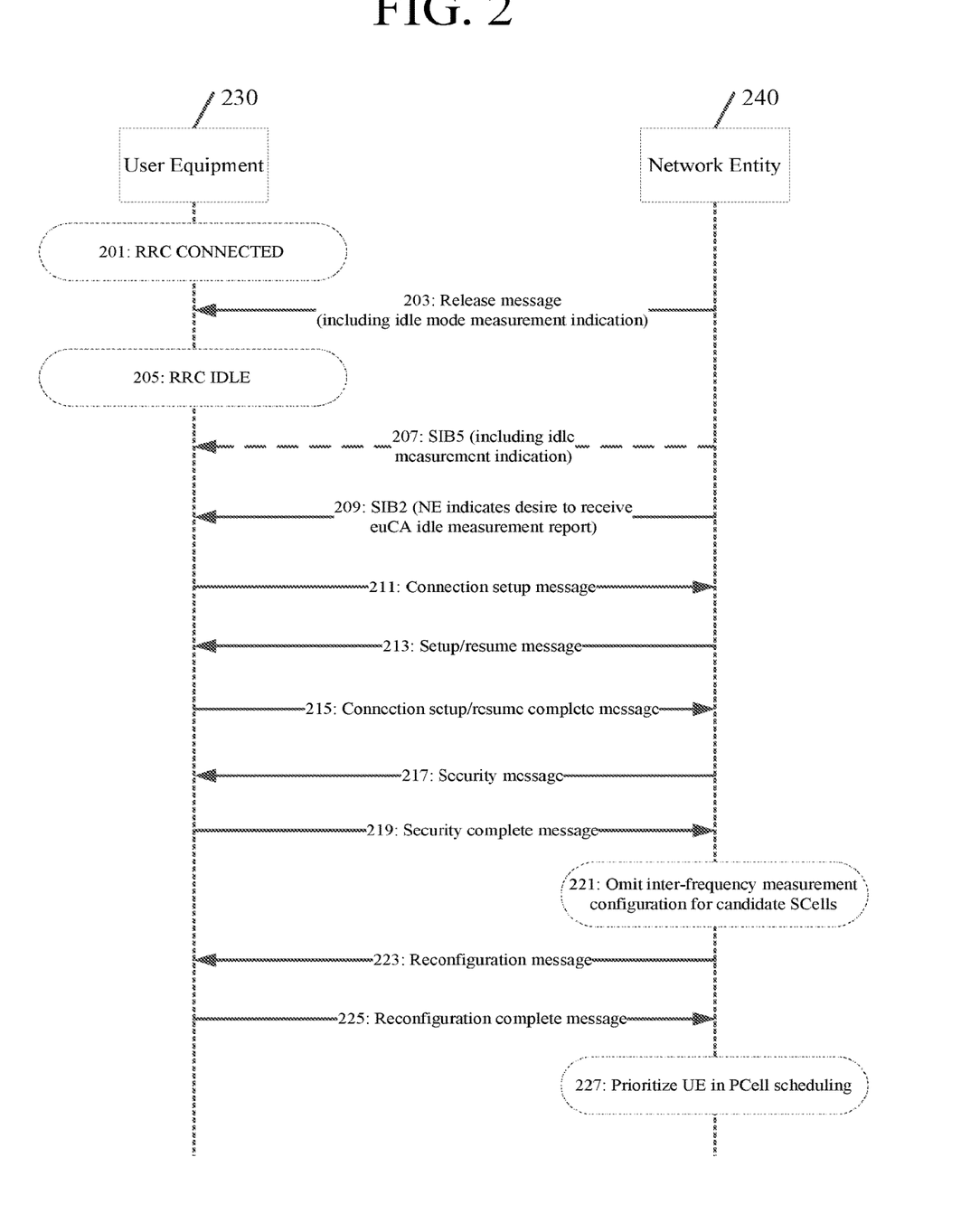
FIG. 2 illustrates an example of a signal flow diagram according to certain embodiments.

FIG. 2 is used as an example, utilizing LTE Rel-15 terminology. However, similar mechanisms may be applied, for example, for measurements performed in inactive state (or any other similar power saving mode or state), where a release message or suspend message would send the UE in idle or inactive or similar state. While in that state, the UE would perform (as configured by the network either through dedicated signaling or broadcast signaling) measurements in idle/inactive or alike state, which later on, the UE may report or not upon back in connected state.

FIG. 2 illustrates an example of a system according to certain embodiments. In step 201, UE 230, which may be similar to UE 520 in FIG. 5, may enter, or be in, a radio resource control (RRC) CONNECTED mode. In step 203, NE 240, which may be similar to NE 510 in FIG. 5, may transmit at least one release message, for example RRCConnectionRelease message to UE 230. In some embodiments, the at least one release message, for example RRCConnectionRelease message may comprise at least one idle/inactive mode measurement indication. In step 205, UE 230 may enter a RRC IDLE mode. In step 207, NE 240 may transmit at least one system information block 5 (SIB5) to UE 230. In some embodiments, the at least one for example SIB5 may comprise at least one idle measurement indication.

In step 209, NE 240 may transmit at least one for example SIB2 to UE 230. In some embodiments, the at least one SIB2 may comprise at least one request for NE 240 to receive at least one euCA/early idle or inactive measurement report from UE 230. In step 211, UE 230 may transmit at least one connection setup, for example, RRCConnectionSetupRequest, message to NE 240. In step 213, NE 240 may transmit at least one setup or resume message, for example, RRCConnectionSetup, message to UE 230. In some embodiments, NE 240 may transmit to UE 230 at least one indication of NE 240 supporting receiving and considering at least one reporting indication during resource selection and scheduling and/or for measurement selection/configuration. Upon receiving the at least one indication, UE 230 may include the reporting indication in at least one RRC connection setup message and/or collect at least one reason why no measurement report may be included in at least one connection setup message.

In step 215, UE 230 may transmit at least one connection setup or resume complete message, for example, RRCConnectionSetupComplete, message to NE 240. The at least one complete message, for example, RRCConnectionSetupComplete, may comprise at least one reporting indication, which may be associated with at least one bit. In some embodiments, UE 230 may transmit at least one indication to NE 240 indicating the capability of UE 230 to support at least one reporting indication capability. Such an indication may improve performance and resource selection during connection setup phase.

In an example embodiment, to help the network understand why measurement results are or are not available, the UE may signal at least one the status of the measurements. The at least one status may indicate whether the UE has performed the measurements but did not find any suitable candidate fulfilling the conditions; whether no cells above a quality threshold were found; whether it was not able to find any cells; whether it had found cells but the measurements had become obsolete, for example the last measurements were done much earlier and were no longer deemed valid; or any other reason why the measurements were not included. The network may also configure which reasons it wants the UE to indicate so that, for example, the UE may only indicate measurement availability, with only 1 bit being used.

In some example embodiments, the UE may signal at least one of the following different options to the network: 1) measurements available (i.e. existing indication); 2) measurements available (i.e. some cells detected) but all measured candidates are below threshold; 3) no measurements available (i.e. no cells were detected); 4) measurements available but results are obsoleted (i.e. UE has not been able to measure the cells for long enough to consider the stored results as obsolete); 5) previous SCell configuration is still valid (i.e. the UE has stored the previous configuration and the SCell quality meets the indicated criteria for IDLE measurements).

In some example embodiments, option 5) may enable the UE to indicate to the network whether the last configured SCell is still suitable. For example, if the measured cell used as a SCell is suitable (or for example better than given threshold), the network would indicate this. In an example embodiment, it may (additionally or not) indicate that the UE has stored the configuration, so that network could perform a fast reconfiguration of the S Cell to activate it.

In order to indicate each of these five different options, at least 3 bits may be required. However, it may be that not all of the values are needed or deemed useful, so it could be possible that the network configures which values should be indicatable, or this could be limited by the specification.

For example, if UE would be to indicate if the previous SCell configuration is still usable/good, the network could reconfigure that directly without waiting for any measurement results. This would be a useful and common case to merit a separate signaling.

In some example embodiments, the at least one reporting indication may be a first indication, such as "1," indicating that at least one measurement is available and/or that UE 230 is configured to transmit the at least one measurement for NE 240 to perform at least one SCell configuration. In some embodiments, the at least one reporting indication may be a second indication, such as "2," indicating that at least one measurement is available, but is lower than at least one quality threshold. In some embodiments, the at least one reporting indication may be a third indication, such as "3," indicating that no small cells were detected by UE 230. In some embodiments, the at least one reporting indication may be a fourth indication, such as "4," indicating that at least one measurement is available, but is obsolete. In some embodiments, the at least one reporting indication may be a fifth indication, such as "5," indicating that at least one previous SCell configuration is still valid. Further representations of the reporting indications may be used, for example, with a sequence of n bits where the binary representation number corresponds to one indication of the possible different reasons, a sequence of m bits where each bit position refers to one reason of the m different reasons, or a sequence of letters/characters/numbers where each sequence refers to an indication of one reason why no measurements have been reported. UE 230 may report two or more indications if more than one reason applies, for example, by using a sequence of indications or the sequence of bits as indicated above.

In step 217, NE 240 may transmit at least one security message, for example, SecurityModeCommand, to UE 230. In step 219, UE 230 may transmit at least one security complete message for example SecurityModeComplete message to NE 240.

In step 221, if the at least one reporting indication is a first indication, NE 240 may omit at least one inter-frequency measurement frequency configuration for at least one candidate SCell. For example, NE 240 may omit at least one inter-frequency measurement frequency configuration associated with at least one carrier of candidate SCell configured for at least one euCA measurement and/or may prioritize at least one resource of PCell for UE 230 which may avoid throughput/performance degradation until a report for configured inter-frequency measurements of candidate SCell will arrive at NE 240. Therefore, omitting measurements may not cause a delay in transmission flow, and may maintain or improve CA/DC performance. For example, NE 240 may prioritize UE 230 in PCell instead, for scheduling, since it is unlikely that traffic of UE 230 can be offloaded to an inter-frequency cell, such as a small cell, using CA/DC.

If the at least one reporting indication is a third indication, NE 240 may avoid assigning inter-frequency measurements for CA/DC or alike MR-DC schemes for a predetermined period of time and/or until a predetermined trigger since UE 230 has been unable to detect any inter-frequency cell. In this case, for example, NE knows there may not be a reason to immediately assign inter-frequency measurements for CA since UE has not been able to even detect any inter-frequency cells.

If the at least one reporting indication is a fourth indication, NE 240 may be configured to consider that UE 230 has not performed at least one measurement for a predetermined period of time, but has previously-detected at least one acceptable cell. Furthermore, NE 240 may transmit at least one request to UE 230 to request the at least one performed measurement and/or the time that/when the at least one performed measurement was performed, which may provide useful information to NE 240. Thus, NE 240 knows that UE 230 has not been measuring for awhile, but had previously detected some cells. This would allow NE 240 to know that configuring measurements may still provide useful information, and it could even be possible to request the obsoleted results as well, along with potentially information on how old the measurements are to determine whether they are obsolete.

In step 223, NE 240 may transmit at least one reconfiguration message, for example, RRCConnectionReconfiguration, message to UE 230, and in step 225, UE 230 may transmit at least one reconfiguration complete message, for example, RRCConnectionReconfigurationCompete, to NE 240.

In step 227, if the at least one reporting indication is a second indication, NE 240 may prioritize UE 230 in at least one PCell schedule. For example, NE 240 may know that the at least one measurement performed by UE 230 has been unable to identify at least one acceptable SCell candidate, for example, based upon at least one assigned measurement configuration. Alternatively, NE 240 may transmit at least one request to UE 230 to receive the at least one measurement result from UE 230 in order to determine the radio conditions under which UE 230 is operating. For example, in this case, NE 240 prioritizes UE 230 in current serving cell, as it knows UE 230 has not been able to measure a (good) SCell candidate (at least based on the assigned measurement configuration). Alternatively, network could still also request to receive those measurement results to better understand the radio conditions in which UE 230 is operating.

In some embodiments, if the at least one reporting indication is a fifth indication, NE 240 may re-configure at least one previous UE configuration. For example, NE 240 may know that the previous SCell configuration may be used and can quickly configure the previous UE configuration again.

FIG. 2-5 utilizes Rel-15 LTE terminology, but similarly can be envisioned for later releases or system where the message structure and/or meaning is similar to the exemplified cases.

Figure 3:
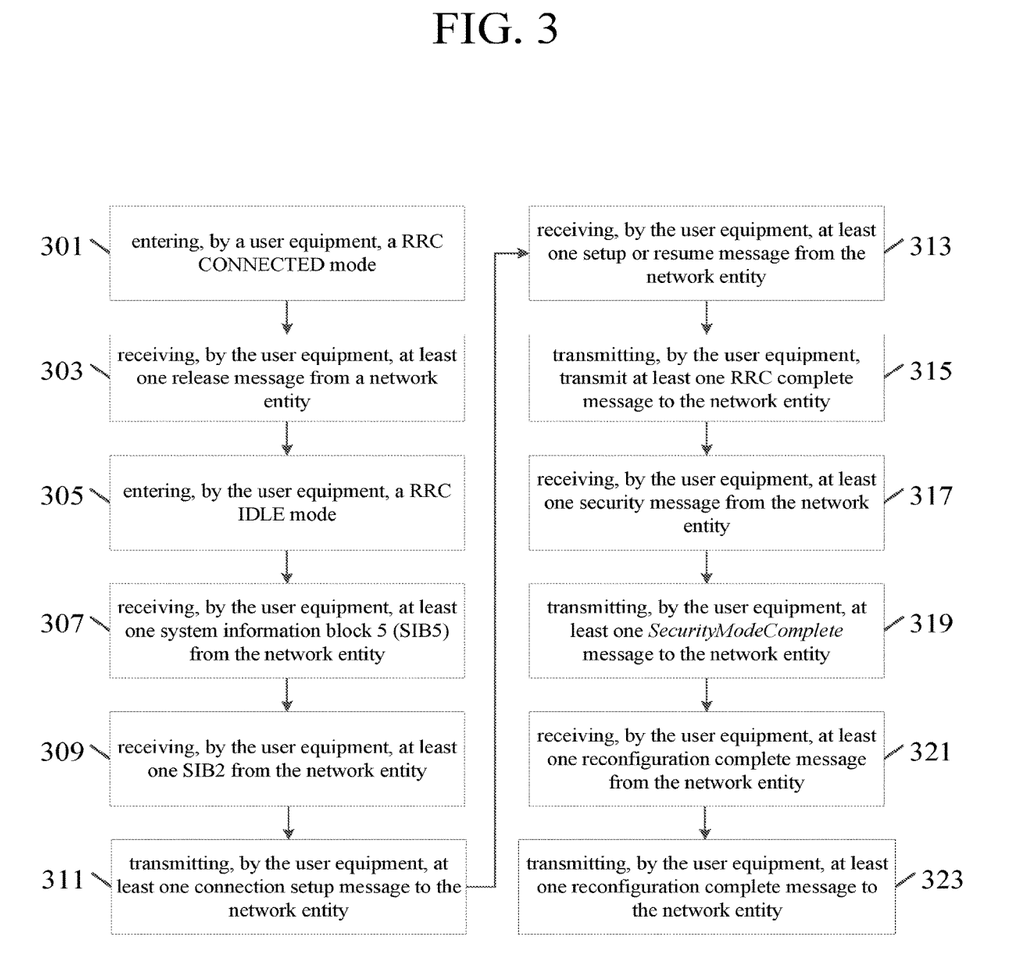
FIG. 3 illustrates an example of a method performed by a user equipment according to certain embodiments.
Figure 5:
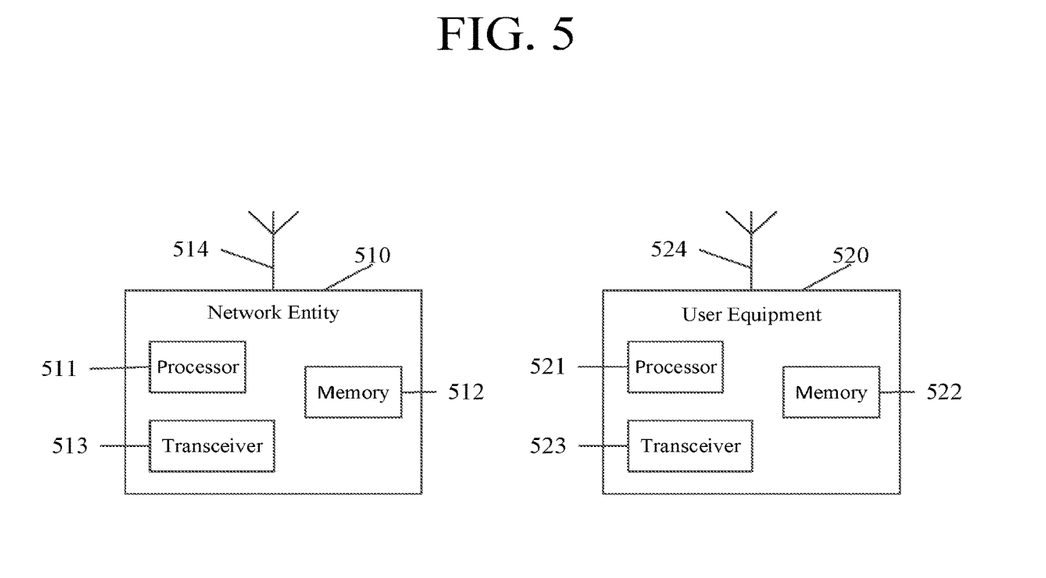
FIG. 5 illustrates an example of a system architecture according to certain embodiments.

FIG. 3 illustrates an example of a method performed by a UE, such as UE 520 illustrated in FIG. 5, according to certain embodiments. In step 301, the UE may enter, or be in, a RRC CONNECTED mode. In step 303, the UE may receive at least one release message, for example, RRCConnectionRelease message from a NE, such as NE 510 in FIG. 5. In some embodiments, the at least one release message, for example RRCConnectionRelease message may comprise at least one idle/inactive mode measurement indication. In step 305, the UE may enter a RRC IDLE mode. In step 307, the UE may receive at least one system information block 5 (SIB5) from the NE. In some embodiments, the at least one, for example, SIB5 may comprise at least one idle measurement indication.

In step 309, the UE may receive at least one, for example, SIB2 from the NE. In some embodiments, the at least one, for example, SIB2 may comprise at least one request for the NE to receive at least one euCA/early idle or inactive measurement report from the UE. In step 311, the UE may transmit at least one connection setup, for example, RRCConnectionSetupRequest, message to the NE. In step 313, the UE may receive at least one setup or resume message, for example, RRCConnectionSetup, from the NE.

In step 315, the UE may transmit at least one RRC complete message, for example, RRCConnectionSetupComplete, message to the NE. The at least one complete message, for example, RRCConnectionSetupComplete, may comprise at least one reporting indication, which may be associated with at least one bit. In some embodiments, the at least one reporting indication may be a first indication, such as "1," indicating that at least one measurement is available and that the UE is configured to transmit the at least one measurement for the NE to perform at least one SCell configuration. In some embodiments, the at least one reporting indication may be a second indication, such as "2," indicating that at least one measurement is available but is lower than at least one quality threshold. In some embodiments, the at least one reporting indication may be a third indication, such as "3," indicating that no small cells were detected. In some embodiments, the at least one reporting indication may be a fourth indication, such as "4," indicating that at least one measurement is available but is obsolete. In some embodiments, the at least one reporting indication may be a fifth indication, such as "5," indicating that at least one previous SCell configuration is still valid. For example, the NE may know that the previous SCell configuration may be used and can quickly configure the previous UE configuration again. Further representations of the reporting indications may be used, for example, with a sequence of n bits where the binary representation number corresponds to one indication of the possible different reasons, a sequence of m bits where each bit position refers to one reason of the m different reasons, or a sequence of letters/characters/numbers where each sequence refers to an indication of one reason why no measurements have been reported. The UE may report two or more indications if more than one reason applies, for example, by using a sequence of indications or the sequence of bits as indicated above.

In step 317, the UE may receive at least one security message, for example, SecurityModeCommand, from the NE. In step 319, the UE may transmit at least one SecurityModeComplete message to the NE. In step 321, the UE may receive at least one reconfiguration message, for example, RRCConnectionReconfiguration, from the NE, and in step 323, the UE may transmit at least one reconfiguration complete message, for example, RRCConnectionReconfigurationComplete, to the NE.

Figure 4:
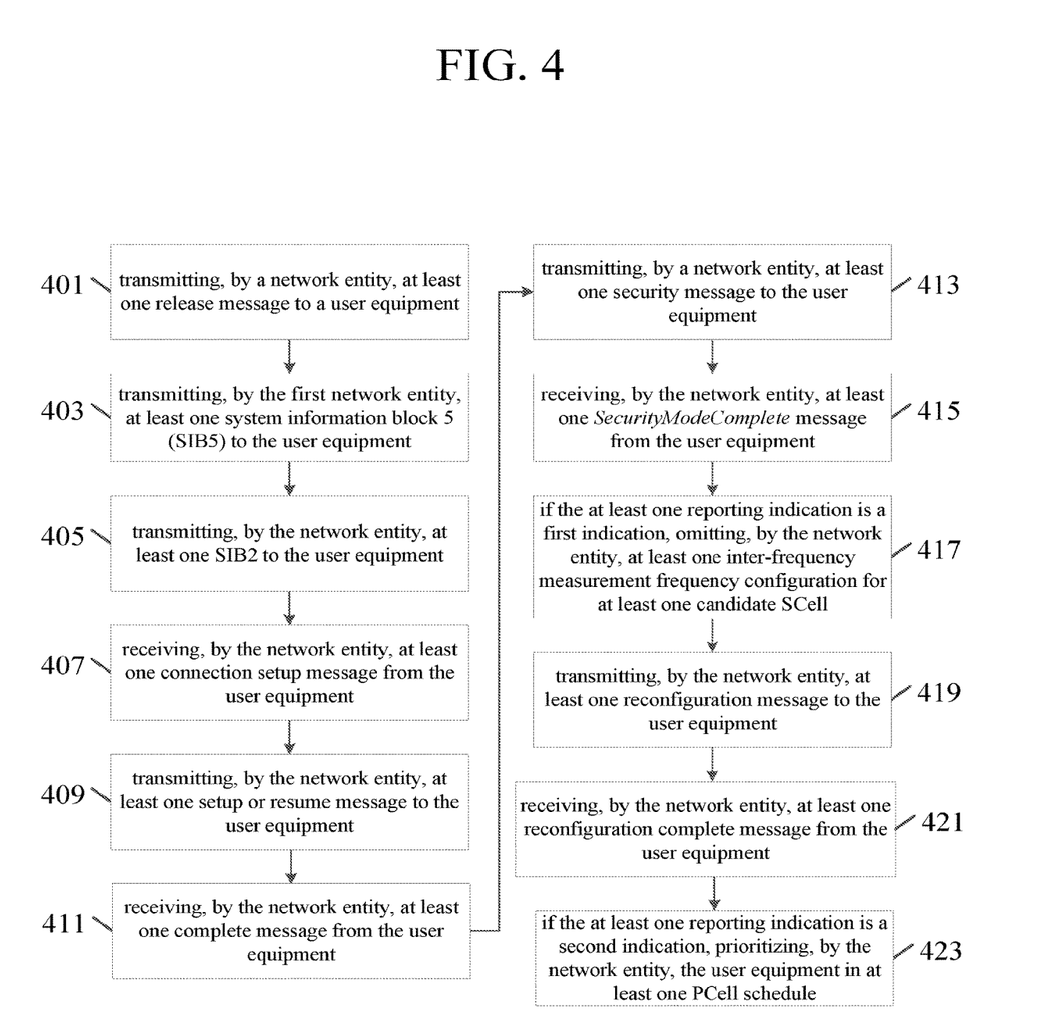
FIG. 4 illustrates an example of another method performed by a network entity according to certain embodiments.

FIG. 4 illustrates an example of a method performed by a network entity, such as NE 510 illustrated in FIG. 5, according to certain embodiments. In step 401, the NE may transmit at least one release message, for example, RRCConnectionRelease message to a UE, such as UE 520 in FIG. 5. In some embodiments, the at least one release message, for example RRCConnectionRelease message may comprise at least one idle/inactive mode measurement indication. In step 403, the NE may transmit at least one system information block 5 (SIB5) to the UE. In some embodiments, the at least one, for example, SIB5 may comprise at least one idle measurement indication.

In step 405, the NE may transmit at least one, for example, SIB2 to the UE. In some embodiments, the at least one, for example, SIB2 may comprise at least one request for the NE to receive at least one euCA/early idle or inactive measurement report from the UE. In step 407, the NE may receive at least one connection setup, for example, RRCConnectionSetupRequest, message from the UE. In step 409, the NE may transport at least one setup or resume message, for example, RRCConnectionSetup, messageB to the UE.

In step 411, the NE may receive at least one RRC complete message, for example, RRCConnectionSetupComplete, message from the UE. The at least one complete message, for example, RRCConnectionSetupComplete, may comprise at least one reporting indication, which may be associated with at least one bit. In some embodiments, the at least one reporting indication may be a first indication, such as "1," indicating that at least one measurement is available and that the UE is configured to transmit the at least one measurement for the NE to perform at least one SCell configuration. In some embodiments, the at least one reporting indication may be a second indication, such as "2," indicating that at least one measurement is available but is lower than at least one quality threshold. In some embodiments, the at least one reporting indication may be a third indication, such as "3," indicating that no small cells were detected. In some embodiments, the at least ne reporting indication may be a fourth indication, such as "4," indicating that at least one measurement is available but is obsolete. In some embodiments, the at least one reporting indication may be a fifth indication, such as "5," indicating that at least one previous S Cell configuration is still valid. For example, the NE may know that the previous SCell configuration may be used and can quickly configure the previous UE configuration again. Further representations of the reporting indications may be used, for example, with a sequence of n bits where the binary representation number corresponds to one indication of the possible different reasons, a sequence of m bits where each bit position refers to one reason of the m different reasons, or a sequence of letters/characters/numbers where each sequence refers to an indication of one reason why no measurements have been reported. The UE may report two or more indications if more than one reason applies, for example, by using a sequence of indications or the sequence of bits as indicated above.

In step 413, the NE may transmit at least one security message, for example, SecurityModeCommand, to the UE. In step 415, the NE may receive at least one SecurityModeComplete message from the UE.

In step 417, if the at least one reporting indication is a first indication, the NE may omit at least one inter-frequency measurement frequency configuration for at least one candidate SCell. For example, the NE may omit at least one inter-frequency measurement frequency configuration associated with at least one carrier of candidate SCell configured for at least one euCA measurement and/or may prioritize at least one resource of PCell for the UE which may avoid throughput/performance degradation until a report for configured inter-frequency measurements of candidate SCell will arrive at the NE. Therefore, omitting measurements may not cause a delay in transmission flow, and may maintain or improve CA/DC performance. For example, the NE may prioritize the UE in PCell instead, for scheduling, since it is unlikely that traffic of the UE can be offloaded to an inter-frequency cell, such as a small cell, using CA/DC.

If the at least one reporting indication is a third indication, the NE may avoid assigning inter-frequency measurements for CA/DC or alike MR-DC schemes for a predetermined period of time and/or until a predetermined trigger since the UE has been unable to detect any inter-frequency cell. In this case, for example, the NE knows there may not be a reason to immediately assign inter-frequency measurements for CA since UE has not been able to even detect any inter-frequency cells.

If the at least one reporting indication is a fourth indication, the NE may be configured to consider that the UE has not performed at least one measurement for a predetermined period of time, but has previously-detected at least one acceptable cell. The NE may transmit at least one request to the UE to request the at least one performed measurement and/or the time that/when the at least one performed measurement was performed, which may provide useful information. Thus, the NE 240 may know that the UE has not been measuring for awhile, but had previously detected some cells. This would allow the NE to know that configuring measurements may still provide useful information, and it could even be possible to request the obsoleted results as well, along with potentially information on how old the measurements are to determine whether they are obsolete.

In step 419, the NE may transmit at least one reconfiguration message, for example, RRCConnectionReconfiguration, to the UE, and in step 421, the NE may receive at least one reconfiguration complete message, for example, RRCConnectionReconfigurationComplete, from the NE.

In step 423, if the at least one reporting indication is a second indication, the NE may prioritize the UE in at least one PCell schedule. For example, the NE may know that the at least one measurement performed by the UE has been unable to identify at least one acceptable S Cell candidate, for example, based upon at least one assigned measurement configuration. Alternatively, the NE may transmit at least one request to the UE to receive the at least one measurement result from the UE in order to determine the radio conditions under which the UE is operating. For example, in this case, the NE prioritizes the UE in a current serving cell, as it knows the UE has not been able to measure a (good) SCell candidate, at least based on the assigned measurement configuration. Alternatively, the network could also request to receive those measurement results to better understand the radio conditions in which the UE is operating.

In some embodiments, if the at least one reporting indication is a fifth indication, the NE may re-configure at least one previous UE configuration.

FIG. 5 illustrates an example of a system according to certain embodiments. In one embodiment, a system may include multiple devices, such as, for example, network entity 510 and/or user equipment 520.

Network entity 510 may be one or more of a base station, such as an evolved node B (eNB) or 5G or New Radio node B (gNB), a serving gateway, a server, and/or any other access node or combination thereof. Network entity 510 may also be similar to user equipment 520. Furthermore, network entity 510 and/or user equipment 520 may be one or more of a citizens broadband radio service device (CBSD).

User equipment 520 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

One or more of these devices may include at least one processor, respectively indicated as 511 and 521. Processors 511 and 521 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 512 and 522. The memory may be fixed or removable. The memory may include computer program instructions or computer code contained therein. Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 511 and 521 and memories 512 and 522 or a subset thereof, may be configured to provide means corresponding to the various blocks of FIGS. 1-4. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 5, transceivers 513 and 523 may be provided, and one or more devices may also include at least one antenna, respectively illustrated as 514 and 524. The device may have many antennas, such as an array of antennas configured for multiple input multiple output (MIMO) communications, or multiple antennas for multiple radio access technologies. Other configurations of these devices, for example, may be provided. Transceivers 513 and 523 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 1-4). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-4. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP 3rd Generation Partnership Project
CA Carrier Aggregation
DC Dual Connectivity
DCCA Dual Connectivity Carrier Aggregation
eMBB Enhanced Mobile Broadband
eNB Evolved Node B
euCA Enhanced Utilization of Carrier Aggregation
EPC Evolved Packet Core
gNB Next Generation eNB
GPS Global Positioning System
LTE Long-Term Evolution
MCS Modulation and Coding Scheme
MME Mobility Management Entity
MTC Machine-Type Communications
NE Network Entity
NR New Radio
PCell Primary Cell
RAN Radio Access Network
SCell Secondary Cell
UE User Equipment
UL Uplink
URLLC Ultra-Reliable and Low-Latency Communication
WLAN Wireless Local Area Network

We claim:

1. A method, comprising:
receiving, by a user equipment, from a base station, at least one RRCConnectionRelease message comprising one or more measurements to be performed during an idle/power saving mode;
transmitting, by the user equipment while operating in the idle/power saving mode, to the base station, at least one RRCConnectionSetupComplete message comprising at least one reporting indication indicating that at least one measurement of the one or more measurements is available and obsolete;
receiving, by the user equipment while operating in the idle/power saving mode, from the base station, at least one request for at least one of: the at least one available and obsolete measurement, or a time that the at least one available and obsolete measurement was performed;
transmitting, by the user equipment while operating in the idle/power saving mode, to the base station, at least one of: the at least one available and obsolete measurement, or the time that the at least one available and obsolete measurement was performed;
receiving, by the user equipment while operating in the idle/power saving mode, from the base station, at least one RRCConnectionReconfiguration message; and
transmitting, by the user equipment while operating in the idle mode, to the base station, at least one RRCConnectionReconfigurationComplete message.

2. The method according to claim 1, wherein the at least one reporting indication comprises at least one of:
a first indication indicating that the user equipment is able to transmit the at least one available and obsolete measurement for the base station to configure/aggregate a cell on the inter-frequency carrier using carrier aggregation or dual connectivity;
a second indication indicating that the at least one available and obsolete measurement is lower than at least one quality threshold;
a third indication indicating that no small cells were detected; or
a fourth indication indicating that at least one previous secondary cell configuration is still valid.

3. The method according to claim 1, further comprising:
entering, by the user equipment, a RRC CONNECTED mode.

4. An apparatus, comprising:
at least one processor; and
at least one memory including computer program code, the at least one memory and computer program code being configured, with the at least one processor, to cause the apparatus to perform:
receiving, from a base station, at least one RRCConnectionRelease message comprising one or more measurements to be performed during an idle/power saving mode;
transmitting, while operating in the idle/power saving mode, to the base station, at least one RRCConnectionSetupComplete message comprising at least one reporting indication indicating that at least one measurement of the one or more measurements is available and obsolete;
receiving, while operating in the idle/power saving mode, from the base station, at least one request for at least one of: the at least one available and obsolete measurement, or a time that the at least one available and obsolete measurement was performed;
transmitting, while operating in the idle/power saving mode, to the base station, at least one of: the at least one available and obsolete measurement, or the time that the at least one available and obsolete measurement was performed;
receiving, while operating in the idle/power saving mode, from the base station, at least one RRCConnectionReconfiguration message; and
transmitting, while operating in the idle mode, to the base station, at least one RRCConnectionReconfigurationComplete message.

5. A computer program embodied on a non-transitory computer-readable medium, said computer program comprising instructions which, when executed in hardware, causes the hardware to perform the method according to claim 1.

6. The apparatus according to claim 4, wherein the at least one reporting indication comprises at least one of:
a first indication indicating that the apparatus is able to transmit the at least one available and obsolete measurement for the base station to configure/aggregate a cell on the inter-frequency carrier using carrier aggregation or dual connectivity;
a second indication indicating that the at least one available and obsolete measurement is lower than at least one quality threshold;
a third indication indicating that no small cells were detected; or
a fourth indication indicating that at least one previous secondary cell configuration is still valid.

* * * * *